United States Patent [19]

Bessett et al.

[11] 4,209,571
[45] Jun. 24, 1980

[54] PRIMARY ELECTROCHEMICAL CELL

[75] Inventors: Richard A. Bessett, Derry, N.H.; James Epstein, Sharon; Franz Goebel, Ashland, both of Mass.

[73] Assignee: GTE Laboratories Incorporated, Waltham, Mass.

[21] Appl. No.: 608,424

[22] Filed: Aug. 28, 1975

[51] Int. Cl.² ............................................. H01M 6/50
[52] U.S. Cl. ........................................ 429/7; 429/62; 429/50
[58] Field of Search .................. 136/181, 182; 429/50, 429/62, 58, 54, 7

[56] References Cited

U.S. PATENT DOCUMENTS

| | | | |
|---|---|---|---|
| 2,289,128 | 7/1942 | Kopf | 136/182 |
| 2,876,271 | 3/1959 | Cahoon | 136/181 |
| 3,081,366 | 3/1963 | Belove | 136/181 |
| 3,546,024 | 7/1968 | Niklas | 136/182 |
| 3,617,386 | 11/1971 | Boshen et al. | 136/181 |
| 3,885,991 | 5/1975 | Finkel | 136/181 |
| 3,939,011 | 2/1976 | Zaleski | 429/54 |

Primary Examiner—Donald L. Walton
Attorney, Agent, or Firm—Fred Fisher

[57] ABSTRACT

A primary electrochemical cell includes a thermal switch electrically connected between one of the electrodes and its associated terminal to prevent the cell from being discharged when the temperature inside the cell exceeds a predetermined level.

4 Claims, 1 Drawing Figure

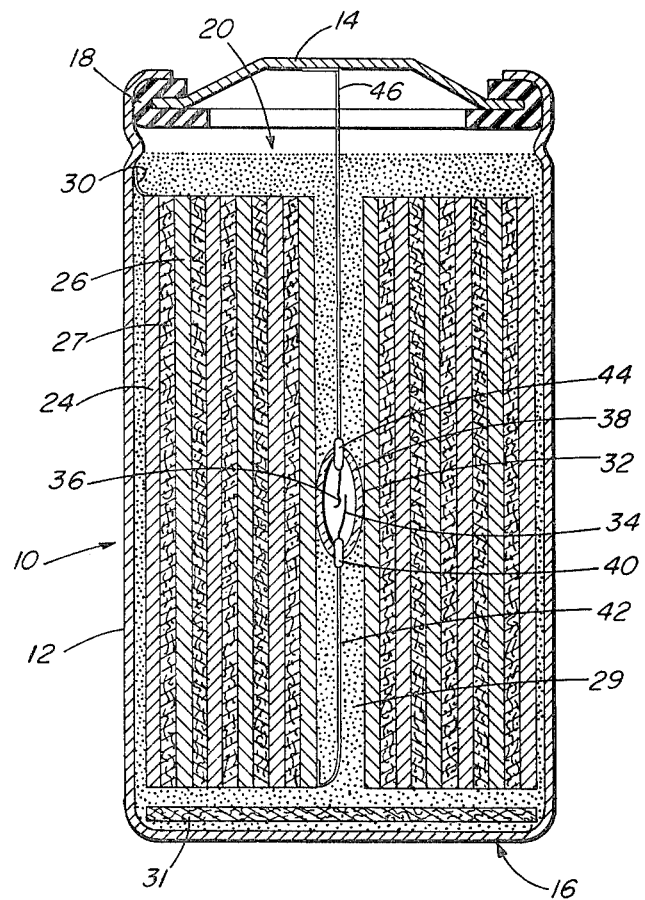

PRIMARY ELECTROCHEMICAL CELL

BACKGROUND OF THE INVENTION

This invention relates generally to electrochemical power cells, and is more particularly concerned with those cells termed primary electrochemical cells.

In copending application Ser. No. 685,214 filed May 11, 1976 (a continuation of Ser. No. 492,316, filed July 26, 1974, now abandoned) and assigned to the assignee of this application, there are described primary electrochemical cells having an oxidizable active anode material, such as lithium, a carbon cathode, and an electrolytic solution between and in contact with the anode and cathode, the electrolytic solution comprising a covalent inorganic oxyhalide solvent, such as phosphorus oxychloride, monofluorophosphoryl dichloride, thionyl chloride, or sulfuryl chloride, and a solute dissolved therein. It has been found that the carbon cathode material catalyzes the electrochemical decomposition of the solvent during discharge of the cell, thereby enabling the otherwise "dead" weight of the solvent to be utilized as a source of energy.

In copending application of Auborn, et al., Ser. No. 515,557, filed Oct. 24, 1974, and assigned to the assignee of this application, now U.S. Pat. No. 3,923,543, issued Dec. 2, 1975, there are described primary electrochemical cells having an oxidizable active anode material, such as lithium, a cathode including, as the active cathode material, an intercalation compound of carbon and fluorine of the general formula $(C_4F)_n$, and an electrolytic solution between and in contact with the anode and cathode, the electrolytic solution comprising a covalent inorganic oxyhalide solvent selected from those set forth above, and a solute dissolved therein. It has been found that the above-identified intercalation compound will catalyze the electrochemical decomposition of the solvent resulting, unexpectedly, in a cell having a coulombic cathode utilization efficiency greater than 100% of that theoretically attainable according to reduction of the active cathode material. Once again, the otherwise "dead" weight of the electrolytic solvent can be utilized as a source of energy.

In U.S. Pat. No. 3,885,991, issued to Joel R. Finkel on May 27, 1975, and assigned to the assignee of this application, there is disclosed a primary cell in which a unidirectional current flow device is mounted inside the cell and is electrically connected between one of the electrodes and its associated terminal to prevent current flow in the recharging direction.

In U.S. Pat. No. 3,622,397, issued to Louis Belove on Nov. 23, 1971, there is disclosed a rechargeable nickel-cadmium cell in which a thermal switch is mounted external to the cell case and electrically connected between the cell and the recharging source to cut off the recharging current upon the attainment of a certain temperature. Since the switch is outside the cell, it does not sense the temperature inside the cell, especially at the center of the cell but, instead, senses the temperature adjacent to, but outside, the cell, case. Furthermore, since it is connected between the cell and the recharging source, it does not prevent the cell from discharging when the preselected temperature is exceeded, but, rather, merely cuts off the recharging current.

It has been found that the safety of the lithium cell depends largely on the rate of discharge, because of IR losses inside the cell. The internal resistance and the rate of discharge determine the heat generation in the cell. If the rate of heat dissipation from the cell to the environment is smaller than the rate of heat generation inside the cell, the cell temperature will increase steadily, if the discharge is continuously maintained to a point where the cell may explode. At this point, some of the cell components (eg. lithium and free sulfur resulting from reduction of the oxyhalide electrolyte) react instantly with each other and all the energy of the system is released at once. This will generally happen if the cell temperature is permitted to exceed the melting points of sulfur and lithium.

SUMMARY OF THE INVENTION

Accordingly, it is an object of the present invention to provide a means for preventing the temperature within a primary cell from exceeding a predetermined level.

It is a further object of the invention to provide a device which may be easily and economically incorporated directly into a primary cell.

Briefly, the invention in its broadest aspect comprises a primary cell having a hermetically sealed housing and an electrochemical system disposed within the housing. The electrochemical system includes a pair of electrodes and an electrolytic solution between and in contact with the pair of electrodes. Each electrode is electrically connected to an electrode terminal, each electrode terminal being a different part of the housing. A thermal switch is electrically connected between one of the electrodes and its associated terminal. The switch allows the cell to be discharged at any rate until it reaches a chosen cutoff temperature at which time the circuit is interrupted. The internal cell circuit will close again as soon as the temperature drops below the preset value of the thermal switch allowing the cell to be used again.

These and other objects, advantages and features of the instant invention will be apparent upon consideration of the following detailed description thereof, taken together with the accompanying drawing.

BRIEF DESCRIPTION OF THE DRAWING

In the Drawing:

The sole FIGURE is a sectional view of a primary electrochemical cell according to the present invention.

DETAILED DESCRIPTION OF THE PREFERRED EMBODIMENTS

Referring to the drawing, there is shown a cross-sectional view of a primary electrochemical cell 10 according to the present invention. The cell 10 includes a hermetically sealed housing which includes an outer case 12, commonly referred to as a "can" and a cover 14. The operative terminals of the cell are the cover 14 and the bottom surface 16 of the can 12. The cover 14 is separated from the outer case 12 by an insulating gasket 18. The electrodes of the primary cell 10 are located in the interior of the outer case 12. The electrodes are spiral wound and are disposed in the space identified by the reference numeral 20. One of the electrodes 24 is made of an anode material such as lithium. The other electrode 26 is made of a grid having, on its outer surface, a cathode material, such as carbon. The two electrodes 24 and 26 are separated from each other by a porous insulating separator 27. The cell is filled with a quantity of electrolytic solution 29 such as lithium tetrachloroaluminate dissolved in thionyl chloride. Other materials for the electrodes and the electrolytic solution are fully described in the aforementioned copending applications, the subject matter thereof being incorporated herein by reference. The electrode 24 is connected to the can 12 through a spot-welded connecting strip 30. An insulating separator disc 31 is disposed at the bottom of the cell so electrodes 24 and 26 will not contact the bottom of the case 12. A more complete teaching of the internal structure of such a cell is found in U.S. Pat. No. 3,510,353 to McHenry, the teachings of which are also incorporated herein by reference.

A thermal switch 32 is disposed inside the cell, preferably at the center. The thermal switch 32 includes a pair of contacts 34 and 36 incorporated in a glass ampoule 38 so as not to come in contact with and chemically react with the electrolytic solution 29. One of the contacts 34 is coupled through a lead 40 to a conducting member 42 connected to electrode 26. The other contact 36 is coupled through a lead 44 to a conducting member 46 which is spot welded to the cover 14. Leads 40 and 44 are made of a material such as RODAR, a trademark for an alloy of iron, nickel and cobalt made by Wilber B. Driver Company, a subsidiary of General Telephone & Electronics Corporation, that is not chemically reactive with the electrolytic solution 29. The operating range of the thermal switch 32, in the embodiment shown and herein described, is between 105° C. and 115° C. and the reset temperature is between 50° C. and 85° C.

While the foregoing description of the preferred embodiments of the invention have been described with particular emphasis on the incorporation of protective devices into electrochemical primary cells utilizing lithium as an anode material and carbon as a cathode material, it is considered within the purview of the invention that the invention is applicable to use and incorporation in all electrochemical cells where the temperature must be kept from exceeding a predetermined level.

It will be understood by those of ordinary skill in the art to which the invention pertains that various changes and modifications may be made therein without departing from the scope of the invention as defined in the appended claims. For example, for different electrochemical systems, different operating ranges and reset ranges for the thermal switch might be required or desirable.

What is claimed is:

1. A primary electrochemical cell comprising a hermetically sealed housing,
   an electrochemical system disposed within the housing, said electrochemical system having a pair of electrodes comprising an anode and a cathode, and an electrolyte in contact therewith, and
   a thermal switch disposed within the housing, said switch being electrically connected between one of the electrodes and the terminal associated therewith and in series with the internal electrical circuit of the cell, said switch sensing the internal cell temperature and preventing the cell from discharging when the cell temperature exceeds a preselected level, and said thermal switch including tin electrical contacts encapsulated within a glass ampoule.

2. A primary electrochemical cell comprising a hermetically sealed housing,
   an electrochemical system disposed within the housing, said electrochemical system having a pair of electrodes comprising an oxidizable anode and a cathode, and an electrolytic solution comprising a covalent inorganic oxyhalide solvent of phosphorus oxychloride, sulfuryl chloride, thionyl chloride, or a mixture thereof, and a solute dissolved therein, in contact therewith, and
   a thermal switch disposed within the housing, said switch being electrically connected between one of the electrodes and the terminal associated therewith and in series with the internal electrical circuit of the cell, said switch sensing the internal cell temperature and preventing the cell from discharging when the cell temperature exceeds a preselected level, wherein said thermal switch opens at about 105° C. to 115° C. and resets at about 50° C. to 85° C.

3. A method of preventing over discharging of an electrochemical cell comprising
   providing an electrochemical cell having a hermetically sealed housing, an electrochemical system within the housing having a pair of electrodes and an electrolyte in contact with the electrodes, and a thermal switch within the housing, the switch being electrically connected between one of the electrodes and the terminal associated therewith, the switch preventing discharging of the cell when the cell temperature reaches a first preselected level, and the switch permitting further discharging of the cell when the cell temperature reaches a lower, second preselected temperature level,
   discharging the cell, whereby, if the cell temperature reaches the first preselected level, the thermal switch prevents further discharging of the cell,
   permitting the cell, after a thermal-switch controlled interruption of cell discharge, to cool to the second preselected temperature, and
   discharging the cell at least one additional time.

4. The method of claim 3 wherein one of the electrodes is a lithium anode, the other electrode is a carbon cathode, the electrolyte comprises phosphorus oxychloride, sulfuryl chloride, thionyl chloride or mixtures thereof and a solute dissolved therein; the first preselected temperature level is about 105° C. to 115° C.; and the second preselected temperature level is about 50° C. to 85° C.

* * * * *